(12) United States Patent
Salvador et al.

(10) Patent No.: US 9,105,086 B2
(45) Date of Patent: Aug. 11, 2015

(54) METHOD AND DEVICE FOR GENERATING A SUPER-RESOLUTION VERSION OF A LOW RESOLUTION INPUT DATA STRUCTURE

(71) Applicant: THOMSON LICENSING, Issy de Moulineaux (FR)

(72) Inventors: Jordi Salvador, Hamburg (DE); Axel Kochale, Springe (DE); Malte Borsum, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 87 days.

(21) Appl. No.: 13/889,460

(22) Filed: May 8, 2013

(65) Prior Publication Data

US 2013/0301933 A1 Nov. 14, 2013

(30) Foreign Application Priority Data

May 10, 2012 (EP) .................................... 12305519

(51) Int. Cl.

| G06K 9/32 | (2006.01) |
| G09G 5/00 | (2006.01) |
| G09G 5/02 | (2006.01) |
| H04N 11/20 | (2006.01) |
| H04N 7/01 | (2006.01) |
| H04N 5/44 | (2011.01) |
| H04N 9/74 | (2006.01) |
| H04N 5/14 | (2006.01) |
| H04N 9/64 | (2006.01) |
| G06F 15/00 | (2006.01) |
| G06F 7/00 | (2006.01) |
| G06F 7/38 | (2006.01) |

(Continued)

(52) U.S. Cl.
CPC ............... *G06T 5/003* (2013.01); *G06T 3/4053* (2013.01)

(58) Field of Classification Search
None
See application file for complete search history.

(56) References Cited

U.S. PATENT DOCUMENTS 6,307,569 B1 10/2001 Ratakonda
8,502,916 B2 * 8/2013 Jung .............................. 348/441

(Continued)

FOREIGN PATENT DOCUMENTS

EP WO2010122502 10/2010
WO WO2011092696 8/2011

OTHER PUBLICATIONS

Glasner et al. "Super-Resolution from a Single Image" IEEE Int. Conf. on Computer Vision 2009.*

(Continued)

*Primary Examiner* — Randolph I Chu
(74) *Attorney, Agent, or Firm* — Tutunjian & Bitetto, P.C.

(57) ABSTRACT

The invention relates to an improved robustness in upscaling the resolution of regularly sampled multi-dimensional signals, where a single low-resolution signal is available. These methods are referred to as example-based super-resolution or single-image super-resolution. A method for super-resolving a single image comprises three stages. First, an interpolation-based up-scaling of the input image is performed, followed by a Local De-noising step in contour regions. The second stage comprises extrapolation through cross-scale block matching, wherein an extrapolated high-frequency band is obtained that is de-noised through regularization in the same contour regions. The third stage comprises adding the contributions of the low-frequency band of the high-resolution image and the extrapolated high-frequency band.

15 Claims, 7 Drawing Sheets

(51) Int. Cl.
    G06T 5/00    (2006.01)
    G06T 3/40    (2006.01)

(56) References Cited

U.S. PATENT DOCUMENTS

| | | | |
|---|---|---|---|
| 2005/0175251 A1* | 8/2005 | Taketa et al. | 382/248 |
| 2006/0284891 A1* | 12/2006 | Kirenko et al. | 345/660 |
| 2008/0309831 A1* | 12/2008 | Jung | 348/744 |
| 2011/0134999 A1* | 6/2011 | Han et al. | 375/240.12 |
| 2011/0206296 A1 | 8/2011 | Sakaguchi et al. | |
| 2012/0086850 A1* | 4/2012 | Irani et al. | 348/441 |
| 2012/0328210 A1* | 12/2012 | Fattal et al. | 382/264 |

OTHER PUBLICATIONS

Suetake et al., "Image super-resolution based on local self.similarity", Optical Review, pp. 26-30, Springer, Berlin, DE vol. 15, No. 1, Mar. 5, 2008.
Search Report dated Oct. 15, 2012.
Irani et al., "Super Resolution from Image Sequences", Proceedings of the International Conf. on Pattern Recognition, Atlantic City, Jun. 16, 1990, pp. 115-120.
Lin et al., "Fundamental limits of reconstruction-based superresolution algorithms under local translation", IEEE Trans. On Pattern Analysis and machine Intelligence, vol. 26, No. 1, Jan. 2004, pp. 1-15.
Shahar et al., "Space-Time Super-Resolution from a Single Video", Proceedings of the 2011 IEEE Conf. on Computer Vision and pattern Recognition, Jun. 20, 2011, pp. 3353-3360.
Freedman et al., "Image and video upscaling from local self-examples", ACM Trans. on Graphics, vol. 30, No. 2, Apr. 2011, pp. 1-11.
Freeman et al., "Example-based super-resolution", IEEE Computer Graphics and Applications, vol. 22, No. 2, 2002, pp. 56-65.
Jueping Bian et al., "Improved SAI method using non-local spatial constraint for image interpolation", Wireless Communications and Signal processing, 2011 International Conf., IEEE Nov. 9, 2011 pp. 1-4.
Shahryar et al., "Investigating image super resolution techniques: What to choose?", Advanced Communication Technology 2012, 14th International Conf. IEEE, Feb. 19, 2012, pp. 642-647.
Zhang et al., "Multi-scale non-local kernel regression for super resolution", nImage Processing, 2011, 18th IEEE International Conf., Sep. 11, 2011, pp. 1353-1356.
Salvador et al., "Patch-based spatio-temporal super-resolution for video with non-rigid motion", Signal Processing: Image Communication, Mar. 1, 2013, pp. 1-12.
Salvador et al., "Robust super-resolution for Interactive Video Navigation", Consumer Electronics, Berlin, IEEE International Conference, Sep. 3, 2012, pp. 1-2.
Fattal, R. "Image Upsampling via Imposed Edge Statistics", ACM Trans. on Graphics, 2007, pp. 1-8.
"Optical Flow Evaluation Results", http://vision.middlebury.edu/flow/eval/results/results-e1.php, Nov. 12, 2014, pp. 1-6.
Dai et al., "Bilateral Back-Projection for Single Image Super Resolution", Multimedia and Expo, 2007 IEEE International Conference on, Jul. 2-5, 2007, pp. 1039-1042.
Sun et al., "Image Super-Resolution using Gradient Profile Prior", IEEE Conf. On Computer Vision and pattern Recognition, Jun. 23-28, 2008, pp. 1-8.
He et al., "Single image super-resolution using Gaussian process regression", Computer Vision and Pattern Recognition (CVPR), 2011 IEEE Conference on, Jun. 20-25, 2011, pp. 449-456.
Ruzic et al., "Single Image Example-based Super-Resolution using Cross-Scale Patch matching and Markov Random Field Modelling", Image Analysis and Recognition, Proceedings of the 8th International Conference, ICIAR, Jun. 22-24, 2011, pp. 1-10.
Yuan et al., "Exploiting Self-Similarities for Single Frame Super-Resolution", 10th Asian Conf. On Computer Vision, ACCV 2010, Nov. 8-12, 2010, pp. 1-13.
Baker et al., "A database and evaluation methodology for optical Flow", Int J Comput Vis. (2011) 92: 1-31, Nov. 30, 2010, pp. 1-31.
"Salvador et al., ""A Compact 3D Representation for Multi-View Video", Image and Video Processing Group Universitat Politecnica de Catalunya, 2010, pp. 1-8.
FascinatE Project—"FascinatE Rendering Node with ROI zoom and Gesture Control", http://www.fascinate-project.eu/index.php/tech-section/frn/, Feb. 3, 2015, pp. 1-2.

* cited by examiner a)

b)

c)

d)

a)          b)          c)

a)          b)

a)    b)

c)    d)

METHOD AND DEVICE FOR GENERATING A SUPER-RESOLUTION VERSION OF A LOW RESOLUTION INPUT DATA STRUCTURE

This application claims the benefit, under 35 U.S.C. §119 of European Patent Application 12305519.6, filed May 10, 2012.

FIELD OF THE INVENTION

This invention relates to a method for generating a super-resolution version of a low resolution input data structure, and to a corresponding device.

BACKGROUND

Super-resolution (SR) processing is known as an improvement of the resolution of regularly sampled multi-dimensional signals. Of special interest is the case where only a low-resolution signal is available. It is a significant difference whether a single low-resolution signal is available or a plurality of similar low-resolution signals, since in the latter case it is possible to exploit richer data values by combining the contributions of the several available signals. In the image processing literature, these methods are generically referred to as example-based super-resolution or, more precisely, single-image super-resolution. Although the following remarks are general and can be applied to signals of different dimensionality, the focus will be on the case of 2D image super-resolution.

Image super-resolution techniques have been well known for many years, starting with "*Super Resolution from Image Sequences*" by M. Irani and S. Peleg. Most commonly, these techniques relate to the estimation of a high-resolution image, given a set of noisy, blurred, low-resolution observations, such as consecutive images in a video sequence, using a reconstruction process that reverses the image formation model. Thus, sub-pixel motion between images, camera and post-processing blur and sub-sampling are reversed in order to fuse the available data and obtain a super-resolved image. Several globally-optimal iterative techniques are available, which basically differ in the assumed image prior model. This provides unique solutions to the otherwise ill-posed problem.

In general, the limiting factors of these techniques are in the estimation of the Point Spread Function (PSF) for image deblurring and the registration, i.e. determination of the sub-pixel motion between images. Generally, SR techniques in the literature refer to classical Optical Flow (OF) estimation techniques for obtaining the registration. These work well in quasi-synthetic examples, but in practice the known solutions in OF estimation are unable to robustly register consecutive frames in video-sequences with sufficient accuracy when more general motion appears.

It is known that, under a wide range of natural conditions, reconstruction-based SR algorithms under Local Translation have a fundamental limit in a maximal increase in resolution of around 1.6×, while in synthetic scenarios, which is the commonly explored in most of the available publications, resolution increases of up to 5.7× are possible. This is due to the favorable conditions in terms of registration, when sub-pixel shifts are generally exact fractions of the pixel size.

An alternative type of SR algorithms attempts to increase the resolution of images by adequately enriching the input visual data (low-resolution images) with a-priori known examples of higher-resolution. These techniques are commonly referred to as example-based super-resolution (EBSR). In "*Example-based super-resolution*", W. T. Freeman, T. R. Jones and E. C. Pasztor obtain suitable high-resolution examples from a sufficiently generic image-patch data-base, the high-frequency contents of which are averaged and conveniently fused with the low-frequency contents of the input image. However, the performance of the algorithm worsens as the target scene deviates from the cases included in the example data-base (when none of the known patches actually resembles that of the input image). In practice, enlarging the size of the data-base would incur an excessive computational cost in the search for the best matching training patches. So, this technique is not generically usable, but is focused on super-resolving images of a certain class.

In order to cope with this problem and behave adaptively to the contents to be magnified, other EBSR algorithms extract high-resolution examples from within the single input image, for which a pyramid representation of the image at different resolutions can be obtained at small downscaling factors. Then, for every patch (e.g. 5×5 pixels) in the input image, matching patches are searched across all or part of the image at different resolutions (levels in the pyramid) in order to perform per-patch data fusion similarly to reconstruction-based super-resolution. This technique is best represented by "*Super-Resolution from a Single Image*" by D. Glasner, S. Bagon and M. Irani, and "*Space-Time Super-Resolution from a Single Video*" by O. Shahar, A. Faktor and M. Irani, which is a follow-up for video super-resolution. The authors obtain a simultaneous increase in image resolution and frame rate, including removal of temporal aliasing, at the cost of an increase of the computational complexity due to 3D spatio-temporal search across video frames at several spatial and temporal scales. This renders the approach unusable for real-time operation with current computing capabilities.

Other known approaches suffer also from being costly and in general not indicated for real-time approaches, or tending to produce some unrealistic-looking edges by imposing excessive contrast, or tending to generate over-smoothing in textured areas, which in a general case produces unnaturally looking images.

In "*Image and Video Upscaling from Local Self-Examples*" by G. Freedman and R. Fattal, the proposed strategy is to exploit self-similarity in a local neighborhood of each image patch. This is shown to provide results close to the full-image searches used in "*Super-Resolution from a Single Image*", with the benefit of a reduced computation time. A drawback of this approach is that the highly sophisticated design of the space-variant filters used for separating high-frequency from low-frequency in the images is not done on the fly, which results in a limited set of selectable up-scaling factors.

A particular problem arising in connection with generating SR data structures, in particular SR images, is that spatial artifacts (such as e.g. contour aliasing) are already included in the low resolution data structure, and the SR processing will usually emphasize these undesired structures.

SUMMARY OF THE INVENTION

The present invention solves at least some of the above-mentioned problems. The invention relates to a method for the improvement of the resolution of regularly sampled multi-dimensional signals, where a single low-resolution signal is available. In the image processing literature, these methods are generically referred to as example-based super-resolution or, more precisely, single-image super-resolution. Although the methodology disclosed herein is general and can be applied to signals of different dimensionality, the following will focus on the case of 2D image super-resolution.

According to the invention, super-resolving a single image comprises three stages. First, an interpolation-based up-scaling of the input image is performed, followed by an equivalent low-pass filtering operation on the low-resolution (LR) image, which result in a low-frequency (LF) band of a high-resolution (HR) image. The second stage comprises extrapolating the high-frequency (HF) band of the high-resolution image, e.g. by cross-scale block matching. The latter may include a search for LF matches between an inspected patch in the HR image and patches in a local neighborhood in the LR-LF image (including also partly overlapping patches), and accumulating the corresponding HF contributions obtained from the LR image. Further, a de-noising mask is generated that indicates potentially noisy or disturbed areas, and local de-noising is applied separately to pixels of at least one of the HF band of the HR image and the LF band of the HR image, as defined by the de-noising mask. In some embodiments, the de-noising of at least one of the LF band and the HF band is achieved by local regularization. The third stage comprises adding the contributions of the locally de-noised LF band of the HR image and the locally de-noised extrapolated HF band of the HR image. The local de-noising has the effect of neutralizing, or at least reducing, the propagation of at least aliasing effects that come from the input image.

One aspect of the present invention is robustness against artifacts from the input image. This robustness is achieved by generating a de-noising mask, applying local de-noising according to the de-noising mask to at least one of the LF band and the HF band of the HR image, whereby in one embodiment the de-noising of at least the extrapolated HF band of the HR image is achieved by local regularization according to the de-noising mask. The local regularization achieves a de-noising effect.

The de-noising mask indicates, in the scale of the super-resolved image, areas where aliasing is more likely to occur than in other areas. It is also referred to as "indicator function" or "mask of potential aliasing-affected pixels" herein. Various algorithms can be used for generating the de-noising mask. In an embodiment, the de-noising mask is generated as follows: a detector for steep contours (e.g. the Sobel method) is applied onto the input LR image, and the regions around contour pixels are extended by applying morphology (e.g. a dilation) on the binary mask resulting from the contour detector. Then the dilated contour is resized to match the size of the super-resolved image. In general, the areas indicated by the de-noising mask as having a higher likelihood of aliasing are referred to as "contour regions" herein, even if a different algorithm is used for detecting areas where aliasing is more likely to occur. Since de-noising and/or regularization are applied only within the contour regions, they are referred to as "local de-noising" and/or "local regularization" herein.

Further, in some embodiments, applying local de-noising comprises applying a Total Variation (TV) regularizer onto the contour regions that are indicated by the de-noising mask. The regularization of the TV regularizer removes artifacts derived from the presence of HF aliasing in the input LR image. Finally, in contour regions of the super-resolved image, the HF band is not generated as an average of the contributions of overlapping local patches, as in other areas, but rather as a set of pixel values minimizing an energy functional. The energy functional considers data cost terms and a TV prior. An advantage of this technique for de-noising is that an anti-aliasing effect is achieved, i.e. the super-resolved image is freed from artifacts in zones where aliasing is more likely to occur, such as regions with high-contrast contours.

In principle, a method for generating a super-resolution version of a single low resolution digital input data structure $S_0$ according to the present invention comprises steps of generating a de-noising mask, upscaling, low-pass filtering and locally de-noising the single low resolution digital input data structure $S_0$ to obtain a locally de-noised low-frequency portion $L_1$ of an upscaled high resolution data structure, and separating the low resolution digital input data structure $S_0$ into a low-frequency portion $L_0$ and a high-frequency portion $H_0$. A high-frequency portion $H_{1,init}$ of the upscaled high resolution data structure is created, which is initially empty (i.e. all pixels are set to zero), and then its pixels are calculated by extrapolation. E.g. in some embodiments, for each of a plurality of patches of the locally de-noised LF portion $L_1$ of the upscaled HR data structure, a best matching block in the LF portion $L_0$ of the LR digital input data structure is searched, and its corresponding block in the HF portion $H_0$ of the LR digital input data structure is determined. In these embodiments, the determined block from the HF portion $H_0$ of the LR digital input data structure is then added to the HF portion $H_{1,acc}$ of the upscaled HR data structure, at the position that the above-mentioned patch in the LF portion $L_1$ of the upscaled HR data structure has. Finally, the resulting extrapolated HF portion $H_{1,acc}$ of the upscaled HR data structure is normalized, locally de-noised, and, in one embodiment, high-pass filtered. The normalized, locally de-noised and high-pass filtered HF portion $H_1$ of the upscaled HR data structure is added to the locally de-noised LF portion $L_1$ of the upscaled HR data structure, which results in an improved de-noised super-resolution version $S_1$ of the single LR digital input data structure $S_0$.

It is noted that for better readability the term "block" is used herein for a group of adjacent values in a low resolution data structure, while the term "patch" is used for a group of adjacent values in a high resolution data structure. However, a block and a patch have the same size (i.e. number and shape of adjacent values) and are substantially the same.

The present invention also relates to an apparatus for performing super-resolution processing of a low resolution input data structure $S_0$ of digital data, comprising in one embodiment a de-noising mask generator for generating a de-noising mask, a splitting module for splitting the input data structure $S_0$ into an LF input data structure $L_0$ and a HF input data structure $H_0$ complementary to the LF input data structure, the splitting module comprising in one embodiment a first low-pass filter $F_{l,0}$ for filtering the input data structure $S_0$, wherein a LF input data structure $L_0$ is obtained, and a subtraction unit (e.g. adder, subtractor, comparator or differentiator) for calculating a difference between the input data structure $S_0$ and the LF input data structure $L_0$, whereby a HF input data structure $H_0$ is generated. The apparatus further comprises an upscaler for upscaling the input data structure $S_0$, a second low-pass filter $F_{l,1}$ for filtering the upscaled input data structure, and a Local De-noiser for locally de-noising the filtered upscaled input data structure according to the de-noising mask, wherein a locally de-noised LF upscaled data structure $L_1$ is obtained. The apparatus further comprises a cross-scale block matching module for generating a normalized HF upscaled data structure $H_{1,n}$ by extrapolating the HF input data structure $H_0$ and normalizing the extrapolated HF upscaled data structure. In one embodiment, the cross-scale block matching module comprises a first determining unit for determining in the locally de-noised LF upscaled data structure $L_1$ a first patch at a first position, a search unit for searching in the LF input data structure $L_0$ a first block that matches the first patch best, and a second determining unit for determining the position of said first block within the LF input data structure $L_0$, a selector for selecting a second block in the HF input data structure $H_0$ at the determined position, an accumulator for accumulating pixel data of the selected second block to a second patch, the second patch being a patch in a HF upscaled data structure $H_{1,acc}$ at the first position, a control unit for controlling repetition of the processing for a plurality of patches in the locally de-noised LF upscaled data structure $L_1$, and a normalizing unit for normalizing the accumulated pixel values in the HF upscaled data structure $H_{1,acc}$. The apparatus further comprises a Local Regularizer for locally de-noising the normalized accumulated (i.e. averaged) pixel values within the contour regions, whereby a locally de-noised normalized HF upscaled data structure $H_1$ is obtained, and a combining unit for combining (e.g. adding) the de-noised normalized HF upscaled data structure $H_1$ with the locally de-noised LF upscaled data structure $L_1$, whereby a de-noised super-resolved data structure $S_1$ is obtained.

The present invention also relates to a computer readable medium having executable instructions to cause a computer to perform a method as explained above. In one embodiment, the present invention relates to a computer readable medium having executable instructions to cause a computer to perform a method for performing super-resolution processing of a low resolution input data structure $S_0$ of digital data, comprising steps of generating a de-noising mask, filtering the input data structure $S_0$ by a first low-pass filter, wherein a LF input data structure $L_0$ is obtained, calculating a difference between the input data structure $S_0$ and the LF input data structure $L_0$, whereby a HF input data structure $H_0$ is generated, upscaling the input data structure $S_0$, and filtering and locally de-noising the upscaled input data structure by a second low-pass filter and a Local De-noiser, wherein a locally de-noised LF upscaled data structure $L_1$ is obtained, extrapolating and normalizing a HF upscaled data structure, whereby a normalized high-frequency upscaled data structure $H_1$ is obtained, locally de-noising the normalized high-frequency upscaled data structure using local regularization, whereby a locally de-noised normalized HF upscaled data structure $H_1$ is obtained, and adding the locally de-noised normalized HF upscaled data structure $H_1$ to the locally de-noised LF upscaled data structure $L_1$, whereby a de-noised super-resolved data structure $S_1$ is obtained.

In one embodiment of the computer readable medium with said executable instructions, the extrapolating a HF upscaled data structure is achieved by determining in the locally de-noised LF upscaled data structure $L_1$ a first patch at a first position, searching in the LF input data structure $L_0$ a first block that matches the first patch best, determining the position of said first block within the LF input data structure $L_0$, selecting a second block in the HF input data structure $H_0$ at the determined position, accumulating pixel data of the selected second block to a second patch, the second patch being a patch in a HF upscaled data structure at the first position, repeating the steps of determining a new patch in the LF upscaled data structure $L_1$, searching in the LF input data structure $L_0$ a block that matches the selected patch best, selecting a corresponding block in the HF input data structure $H_0$ and accumulating pixel data of the selected corresponding block to a patch in the HF upscaled data structure at the position of said new patch, and normalizing the accumulated pixel values in the HF upscaled data structure, whereby a normalized high-frequency upscaled data structure $H_1$ is obtained.

An advantage of the invention is that it is able to produce higher-resolution renditions of any 1D, 2D or 3D digital input data structure (e.g., any digital image) with (in at least one embodiment) any desired non-integer image up-scaling factor. Furthermore, at least outside the contour regions this is done in a general manner, free from the introduction of arbitrary image priors, beyond the assumption that the image must show local self-similarity at different resolution levels, which has proven to hold for general images.

Another advantage of the invention is that, due to the employed self-averaging, less noise is introduced in the upscaled data structure than with conventional methods. A further advantage of the invention is that it works with a single-image, but advantageously does not require a data-base, code book or similar, and not any training or training data, while conventional single-image methods require a data-base for trained retrieving of high-frequency examples. Yet a further advantage of the invention is that not only noise in the image, but also artifacts such as spatial aliasing are reduced.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a flow-chart of a method for performing super-resolution processing.

DETAILED DESCRIPTION OF THE INVENTION

Figure 1:
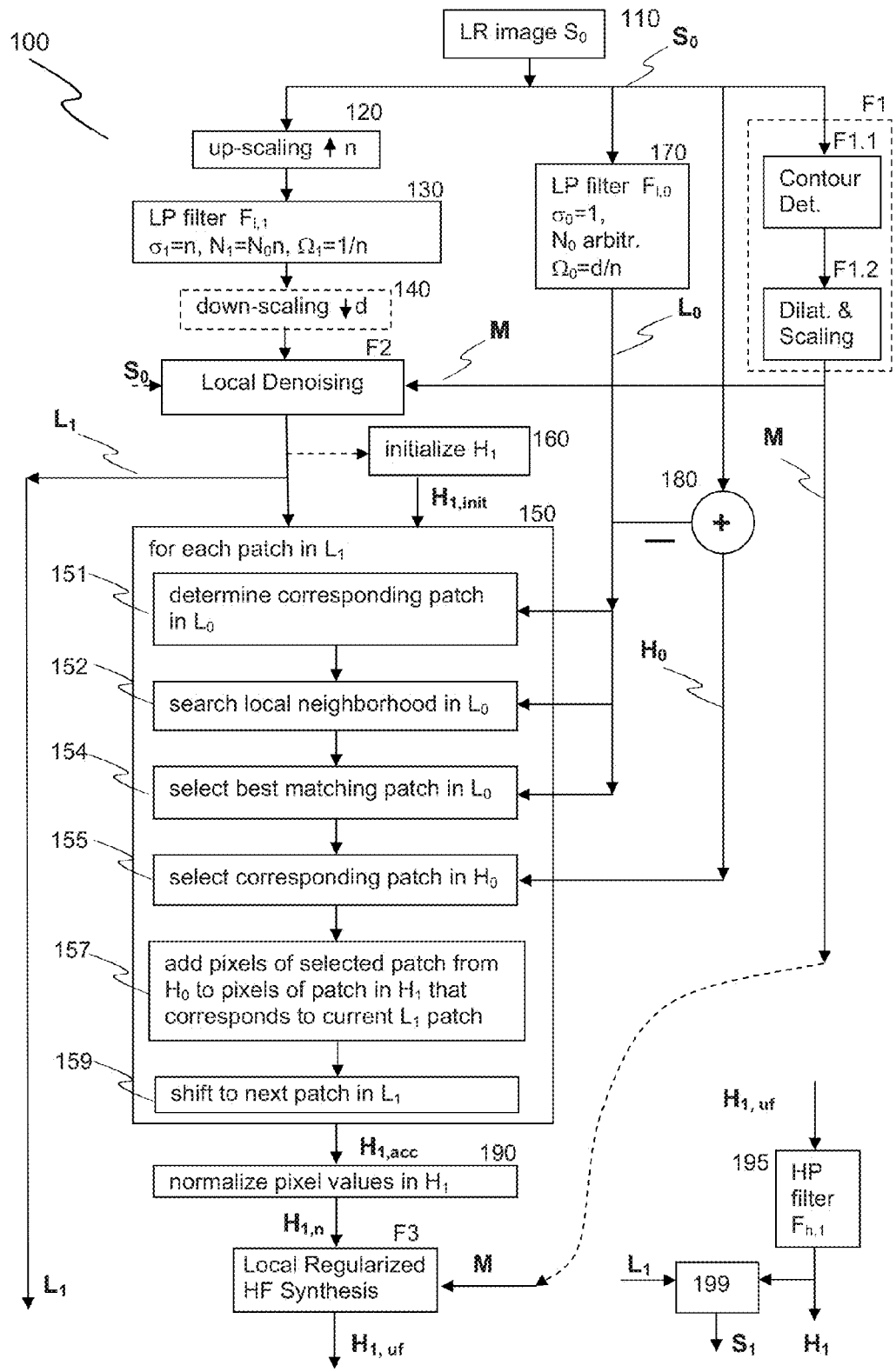

FIG. 1 shows, in an embodiment of the present invention, a flow-chart of a method for performing super-resolution processing of a low resolution input data structure $S_0$ of digital 1D, 2D or 3D data. In this embodiment, the method comprises steps of generating a de-noising mask M, comprising a contour detection step F1.1 and a dilation and scaling step F1.2, filtering 170 the input data structure $S_0$ by a first low-pass filter $F_{l,0}$, wherein a LF input data structure $L_0$ is obtained, calculating in an adder/subtractor 180 a difference between the input data structure $S_0$ and the LF input data structure $L_0$, whereby a HF input data structure $H_0$ is generated, upscaling 120 the input data structure $S_0$, and filtering 130 the upscaled input data structure by a second low-pass filter $F_{l,1}$, wherein a LF upscaled data structure is obtained, locally de-noising F2 the LF upscaled data structure in regions that are indicated by the de-noising mask M, wherein a locally de-noised LF upscaled data structure $L_1$ is obtained, determining in the low-frequency upscaled data structure $L_1$ a first patch $P_{n,L1}$ at a first position, searching 151,152,154 in the low-frequency input data structure $L_0$ a first block $B_{n,L0}$ that matches the first patch $P_{n,L1}$ best, and determining the position of said first block $B_{n,L0}$ within the low-frequency input data structure $L_0$, selecting 155 a second block $B_{n,H0}$ in the high-frequency input data structure $H_0$ at the determined position, accumulating 157 data values (e.g. pixel data) of the selected second block $B_{n,H0}$ to a second patch $P_{n,H1}$, the second patch being a patch in a high-frequency upscaled data structure $H_{1,acc}$ at the first position (that was determined above for the first patch $P_{n,L1}$), repeating 150 the steps of determining a new patch $P_{n,L1}$ in the low-frequency upscaled data structure $L_1$, searching 151, 152,154 in the low-frequency input data structure $L_0$ a block $B_{n,L0}$ that matches the selected patch $P_{n,L1}$ best, selecting 155 a corresponding block $B_{n,H0}$ in the high-frequency input data structure $H_0$ and accumulating 157 pixel data of the selected corresponding block $B_{n,H0}$ to a patch $P_{n,H1}$ in the high-frequency upscaled data structure $H_{1,acc}$ at the position of said new patch $P_{n,L1}$, normalizing 190 the accumulated pixel values in the high-frequency upscaled data structure $H_{1,acc}$, whereby a normalized high-frequency upscaled data structure $H_1$ is obtained, and performing a local regularization F3 in contour regions of the normalized HF upscaled data structure $H_1$, whereby a locally regularized normalized HF upscaled data structure $H_{1,uf}$ is obtained. The local regularization can be done a local regularized HF synthesis. The contour regions are determined from the de-noising mask M. The locally regularized normalized HF upscaled data structure $H_{i,uf}$ is filtered 195 in a high-pass filter $F_{h,1}$ to obtain a filtered locally regularized normalized HF upscaled data structure $H_1$. Finally, a super-resolved data structure $S_1$ is obtained by adding 199 the filtered locally regularized normalized HF upscaled data structure $H_1$ to the LF upscaled data structure $L_1$.

In some embodiments, the upscaled input data structure after filtering 130 by the second low-pass filter $F_{l,1}$ is downscaled 140 by a downscaling factor d, with n>d. Thus, a total non-integer upscaling factor n/d is obtained for the low-frequency upscaled data structure $L_1$. The same upscaling factor is used for upscaling for the de-noising mask, and the same methodology can be used. The high-frequency upscaled data structure $H_{1,init}$ (or $H_1$ respectively) has the same size as the low-frequency upscaled data structure $L_1$. The size of $H_1$ may be pre-defined, or derived from $L_1$. $H_1$ is initialized in an initialization step 160 to an empty data structure $H_{1,init}$ of this size.

Figure 2:
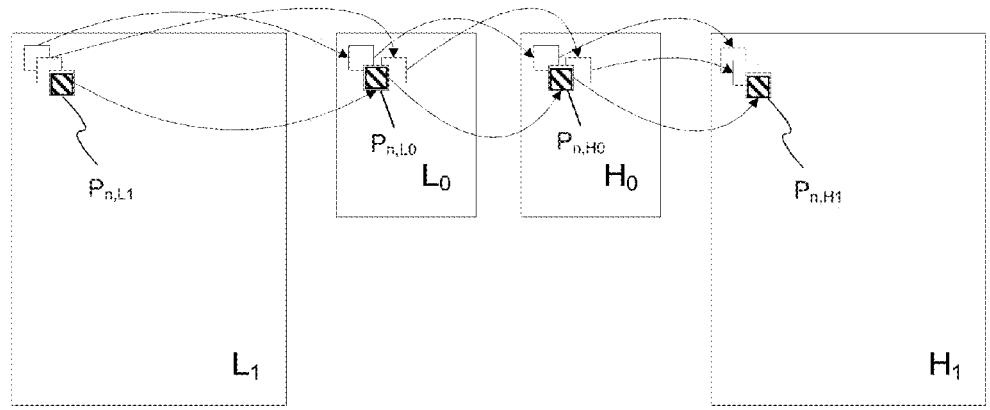
FIG. 2 synthesis of the high-frequency band of the super-resolved image by extrapolation of the high-frequency information of similar patches at the original resolution scale.

FIG. 2 shows an embodiment of the principle of the synthesis of the HF band $H_1$ of a super-resolved (i.e. high resolution) image by extrapolation of the HF information of similar patches at the original resolution scale $H_0$. Note that, if in the following description with respect to FIG. 2-FIG. 7 the high-frequency high-resolution data structure $H_1$ is mentioned, actually the unfiltered, non-normalized HF high-resolution data structure $H_{1,acc}$ (before de-noising) is meant.

The low-frequency band of the high-resolution image $L_1$ is first divided into small patches $P_{n,L1}$ (e.g. 5×5 pixels) with a certain overlap. The choice of the amount of overlap trades-off robustness to high-frequency artifacts (in the case of more overlap) and computation speed (in the case of less overlap). In one embodiment, an overlap of 20-30% in a each direction is selected, i.e. for adjacent patches with e.g. 5 values, 2 values overlap. In other embodiments, the overlap is higher, e.g. 30-40%, 40-50%, around 50% (e.g. 45-55%) or up to 90%. For an overlap below 20% of the patch size, the below-described effect of the invention is usually lower.

As mentioned above and further described below, the final high-frequency band is obtained after normalizing by the number of patches contributing to each pixel, thus resulting in an average value. The larger the overlap between patches is, the better is the suppression of high-frequency artifacts resulting from the high-frequency extrapolation process, and the more values are accumulated.

Then, for each low-frequency high-resolution patch $P_{n,L1}$, a best match in terms of mean absolute difference (MAD, known from motion estimation) is obtained after an exhaustive search in a local search window (e.g. 11×11 pixels) over the low-frequency band $L_0$ of the low-resolution image. The best match is a block $P_{n,L0}$ from the low-frequency high-resolution image $L_0$ that has the same size as the low-frequency high-resolution patch $P_{n,L1}$ (e.g.5×5 pixels). More details about the search window are described below with respect to FIG. 4.

For understanding the next step, it is important to note that the low-resolution low-frequency data structure $L_0$ has the same dimension as the low-resolution high-frequency data structure $H_0$, and the high-resolution low-frequency data structure $L_1$ has the same dimension as the high-resolution high-frequency data structure $H_1$. as shown in FIG. 2. For every patch, the position of the matched low-frequency low-resolution patch $P_{n,L0}$ (within $L_0$) is determined, and the corresponding low-resolution high-frequency patch $P_{n,H0}$ (within $H_0$) at the position of the matched low-frequency low-resolution patch $P_{n,L0}$ is extracted. The extracted low-resolution high-frequency patch $P_{n,H0}$ from $H_0$ is then accumulated on the high-frequency band of the high-resolution image $H_1$, at the same position that the current patch $P_{n,L1}$ in the high-resolution low-frequency data structure $L_1$ has. In detail, each value (e.g. pixel) of the extracted low-resolution high-frequency patch $P_{n,H0}$ from $H_0$ is accumulated on the corresponding value (e.g. pixel) in the respective patch of the high-frequency band of the high-resolution image $H_1$. In this way, the high-frequency band of the high-resolution image $H_1$ is synthesized by patch-wise accumulation. The process of dividing the low-frequency band of the high-resolution image $L_1$ in overlapping patches, finding the best low-frequency match and accumulating the corresponding high-frequency contribution is illustrated in FIG. 3, and is described below.

As a result, each value in the resulting (preliminary) high-frequency band of the high-resolution data structure $H_1$ is a sum of values from a plurality of contributing patches. Due to the patch overlap in $L_1$ (and consequently also in $H_1$ since both have the same dimension), values from at least two patches contribute to many or all values in $H_1$. Therefore, the resulting (preliminary) high-frequency band of the high-resolution data structure $H_1$ is normalized 190. For this purpose, the number of contributing values from $H_0$ for each value in the high-frequency high resolution data structure $H_1$ is counted during the synthesis process, and each accumulated value in $H_{1,acc}$ is eventually divided by the number of contributions.

Figure 3:
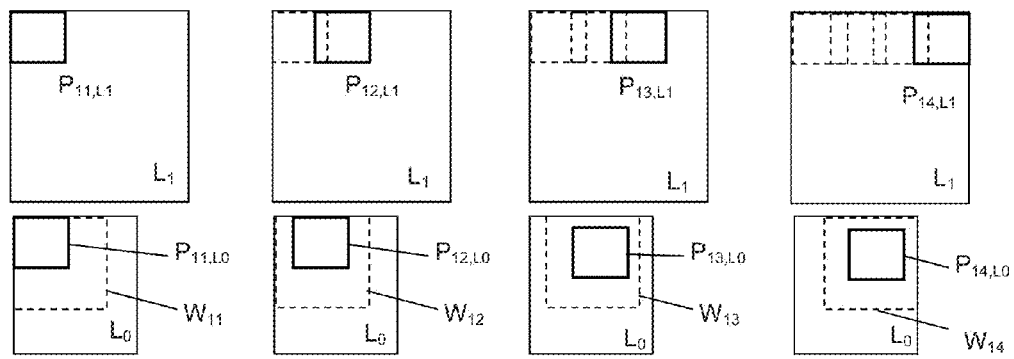
FIG. 3 exemplary usage and positions of a search window.
Figure 3:
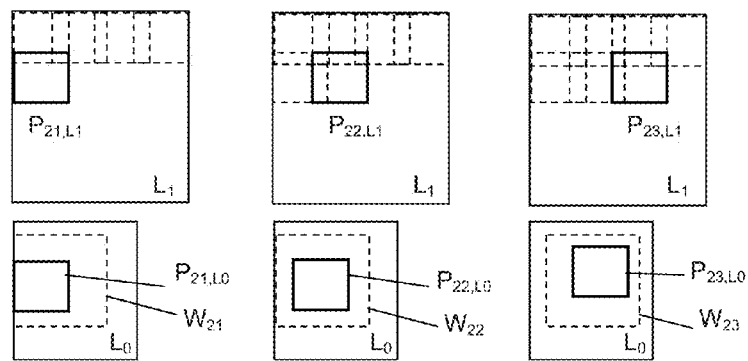

FIG. 3 shows, exemplarily, usage and positioning of a search window within the low-resolution low-frequency data structure $L_0$. For a first patch $P_{11,L1}$ in $L_1$, a first best matching block $P_{11,L0}$ is searched in $L_0$ within a first search window $W_{11}$. Both patches have the same size. The search window is larger than the patch by at least one value in each direction (except on edges, as for the first patch). In this example, the first best matching block $P_{11,L0}$ is found in $L_0$ in the upper left corner of the first search window $W_{11}$. The further process for this patch and block is as described above. Then, subsequent patches are shifted horizontally and/or vertically, wherein each patch overlaps a previous patch.

In the example, a second patch $P_{12,L1}$ is selected at a position that is shifted horizontally by a given patch advance. Patch advance is the difference between patch size and overlap. Patch advances in different dimensions (e.g. horizontal and vertical for 2D data structures) may differ, which may lead to different effects or qualities in the dimensions of the high-resolution output data structure, but they are usually equal. A new search window $W_{12}$ is determined according to the new patch position. In principle, the search windows advance in the same direction as the patch, but slower. Thus, a current search window may be at the same position as a previous search window, as is the case here. However, since another patch $P_{12,L1}$ is searched in the search window, the position of the best matching patch $P_{12,L0}$ will usually be different. The best matching patch $P_{12,L0}$ is then accumulated to the high-resolution high-frequency data structure $H_1$ at the position of the low-frequency high-resolution patch $P_{12,L1}$, as described above. Subsequent patches $P_{13,L1}$ $P_{14,L1}$ are determined and their best matches are searched in the same way. As shown in FIG. 3, the position of the best matching block within the search window is arbitrary and depends on the input data (e.g. the image content).

The above description is sufficient for a 1-dimensional (1D) data structure. For 2D data structures, the position of a further subsequent patch is found by vertical patch advance (this may or may not be combined with a horizontal patch advance). Also vertical patch advance includes an overlap, as mentioned above and shown in FIG. 3 for $P_{21,L1}, \ldots, P_{23,L1}$.

The position of the search window is determined according to the position of the current patch. As shown in FIG. 3, the search windows $W_{11}, \ldots, W_{22}$ of different patches overlap. Since $L_0$ is a smaller data structure than $L_1$, the search window advance in each dimension is very small. In one embodiment, the search windows are on the edge of $L_0$ if their corresponding patch is on an edge of $L_1$, and it is uniformly and/or proportionally moved in between these edges.

In one embodiment (not shown in FIG. 3), the center of the search window is set at a position that is substantially proportional to the center of the patch. E.g. where the center of a patch is at 3% of the high-resolution data structure $L_1$, the center of the search window is set to be at approximately 3% (rounded) of the low-resolution data structure $L_0$. In this case, for patches near an edge, the search window size may be reduced, or the search window may be shifted completely into the low-resolution data structure $L_0$.

In general, the larger the search window, the more likely it is to find a very similar patch. However, in practice little difference in accuracy is to be expected by largely increasing the search window, since the local patch structure is more likely to be found only in a very local region in general natural images. Moreover, a larger search window requires more processing during the search.

Figure 4:
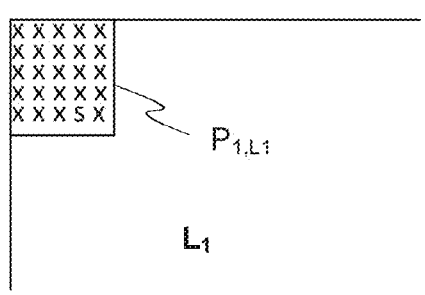
FIG. 4 selection of successive patches in a 2D input data structure, including overlap, and the principle of determining a matching block for successive patches.
Figure 4:
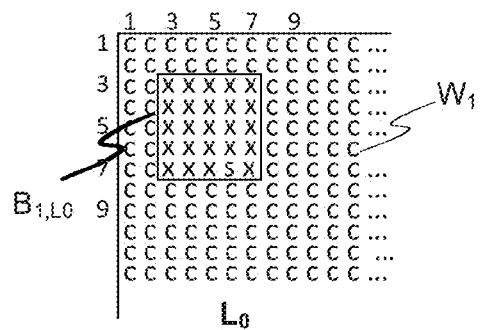
Figure 4:
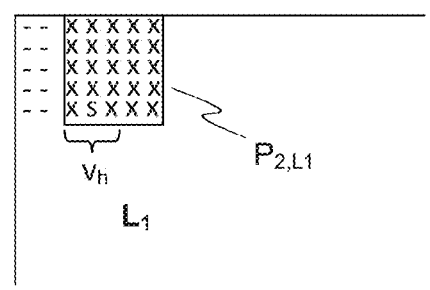
Figure 4:
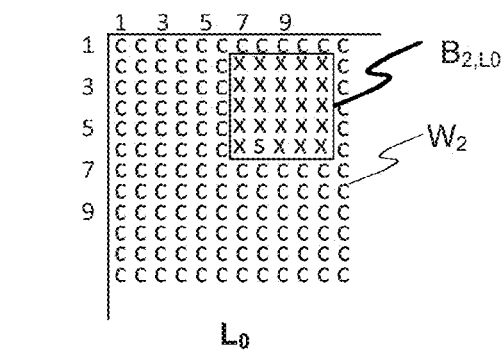
Figure 4:
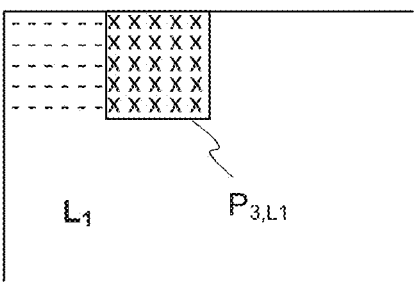
Figure 4:
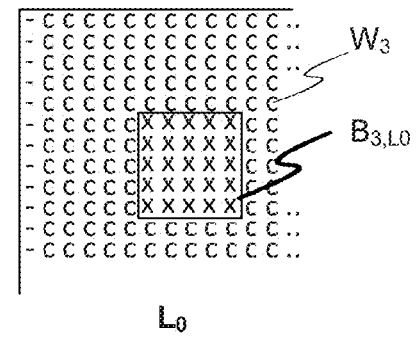
Figure 4:
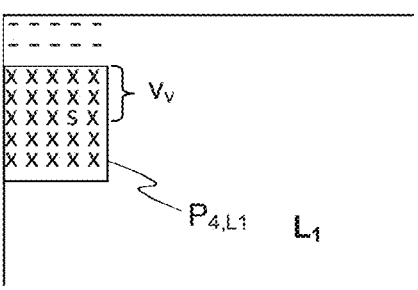
Figure 4:
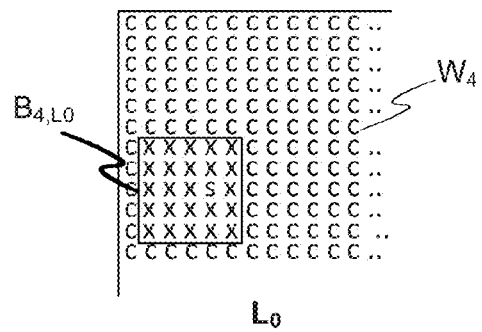

FIG. 4 shows details of the selection of successive patches in an image (i.e. a 2D input data structure), overlap and the principle of determining matching blocks for successive patches. Exemplarily, patches and blocks have 5×5 pixels and search windows have 12×12 pixels. For a first patch $P_{1,L1}$ in $L_1$, a search window $W_1$ is determined in $L_0$, as described above. Within the search window $W_1$, comparison of the first patch at different block positions is performed, and a block $B_{1,L0}$ is determined that has the least mean absolute difference (MAD). This is the best matching block. Its position within the low-resolution low-frequency data structure $L_0$ is determined, e.g. its upper left corner being in the third column and third row.

Then a corresponding patch at the same position in the high-frequency low-resolution image $H_0$ is determined. Thus, it is a 5×5 pixel patch with its upper left corner being in the third column and third row. This patch is extracted from $H_0$ and added to $H_1$ at the position of the current low-frequency high-resolution patch $R_{1,L1}$, i.e. at the upper left corner of $H_1$ (see FIG. 4 a).

The second patch $P_{2,L1}$ is selected according to the employed patch advance, as shown in FIG. 4 b). The patch advance is in this case two pixels in both dimensions, which means that due to the patch size of 5×5 pixels, the overlap is three. Thus, in this example, vertical overlap $v_v$ and horizontal overlap $v_h$ are equal. Due to the slower search window advance, the search window $W_2$ is the same as for the previous patch. However, due to different pixel values (according to arbitrary image content), another best matching block $B_{2,L0}$ within the search window is found. In the same manner as described above, its position is determined (e.g. upper left corner in the $7^{th}$ column, $2^{nd}$ row), the corresponding 5×5 block (with upper left corner in the $7^{th}$ column, $2^{nd}$ row) is extracted from $H_0$, and the extracted block from $H_0$ is added to the high-frequency high-resolution image $H_1$ at the position of the second patch $P_{2,L1}$, i.e. with its upper left corner at the first row, third column. Thus, a particular pixel that belongs to two or more different patches, is accumulated from corresponding pixels of to the best matching blocks. I.e., exemplarily, a particular pixel s in the $4^{th}$ column, $5^{th}$ row of the high-resolution high-frequency image $H_1$ (corresponding to the position in $L_1$ shown in FIG. 4) has, at the current stage of the process as described, a value that is accumulated from a pixel at the $6^{th}$ column, $7^{th}$ row (from the best-matching block $B_{1,L0}$ of the first patch) and from a pixel at the $8^{th}$ column, $6^{th}$ row (from the best-matching block $B_{2,L0}$ of the second patch).

As mentioned above, the search window advances usually only after a plurality of patches have been processed. As shown exemplarily in FIG. 4 c) for the above-described configuration, it takes three patch advances (i.e. the $4^{th}$ patch) before the search window $W_3$ is shifted by one pixel in horizontal direction. Further, it is noted here that the sequential order of various dimensions of the patch advance (and thus search window advance) makes no difference. Thus, the patch depicted in FIG. 4 d) may be processed after previous patches have shifted until the right-hand edge of $L_1$, but it may also be processed directly after the first patch as shown in FIG. 4 a).

Figure 5:
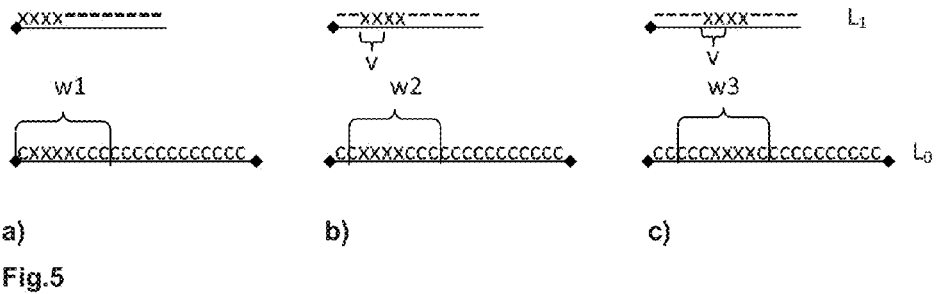
FIG. 5 selection of successive patches in a 1D input data structure, including overlap, and the principle of determining a matching block for successive patches.

FIG. 5 shows a corresponding example for a 1D data structure. Also in this case, a first patch (with values denoted x) at a position #1 ... #4 of a low-frequency high-resolution data structure $L_1$ is located within a search window $w_1$ in the low-frequency low-resolution data structure $L_0$, e.g. values at positions #2 ... #5. Thus, values of the corresponding $H_0$ (not shown) at the positions #2 . . . #5 are added to $H_1$ (not shown) at the positions #1 . . . #4. In a second step, a second patch at a position #3 . . . #6 of $L_1$ is located within a second search window $w_2$ in $L_0$, e.g. at positions #3 . . . #6 of $L_0$ (positions #2 . . . #5 of the search window). Thus, values of the corresponding $H_0$ (not shown) at the positions #3 . . . #6 are added to $H_1$ (not shown) at the positions #2 . . . #5, and so on.

The same principle as described above for 1D and 2D data structures can also be applied to any multi-dimensional data structures, including 3D data structures.

Figure 6:
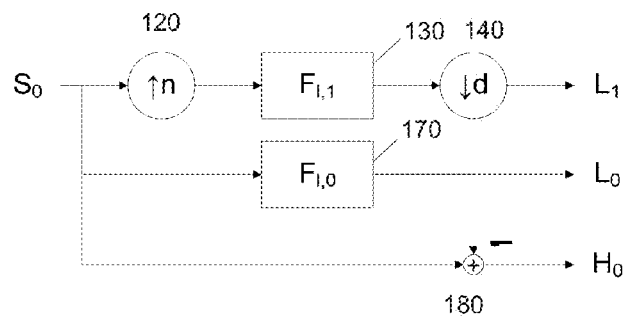
FIG. 6 formation of the up-scaled low-frequency band $L_1$ of the high-resolution image and two-band analysis ($L_0, H_0$) of the low-resolution input image $S_0$.

As mentioned above, the disclosed method for super-resolving a single image is composed of three stages. As the first stage of the invention, FIG. 6 shows the principle of one embodiment for the formation of the up-scaled low-frequency band $L_1$ of the high-resolution image and two-band analysis ($L_0, H_0$) of the low-resolution input image $S_0$. The goal of this first stage of the method is to obtain the low-frequency band of the high-resolution image $L_1$, with an up-scaling factor that in one embodiment is fractional, and a low-resolution image $L_0$ with the same normalized bandwidth, besides the residual high-frequency component $H_0$ of the low-resolution image. A two-band analysis of the low-resolution input image $S_0$ into a low-frequency portion $L_0$ and a high-frequency portion $H_0$ is performed. The cut-off normalized frequency of the low-resolution image is equivalent to that of the high-resolution image. In one embodiment, separable filters are used in order to avoid large convolutions with square Point Spread Functions (PSFs). This means that both the interpolating high-resolution filter $F_{I,1}$ the low-pass low-resolution filter $F_{I,0}$ can be fully expressed as a 1-dimensional filter for which, if desired, the PSF can be computed as the tensor product of the corresponding coefficients vector ($F_{I,1}{}^{2D}=F_{I,1}F_{I,1}{}^T$ and correspondingly for $F_{I,1}$).

In the following, one embodiment for the design of the filters is described.

The design of the two filters shown in FIG. 6 is mainly determined by the rational up-scaling factor n/d and an arbitrary choice of the order $N_0$ of the low-resolution FIR filter $F_{I,0}$. As usual, the choice of the order is determined by the available computing time for convolution. Generally, values in the order of 8 . . . 16 should suffice for providing a steep enough transition band. By choosing even values for the order N, resulting in N+1 filter coefficients, additional phase shifts are avoided and a more accurate high-frequency band is obtained. Both low-pass filters $F_{I,1}$ and $F_{I,0}$ are real and have linear phase, i.e. they are finite impulse response (FIR) filters. The normalized gain of every filter at the corresponding cut-off frequency is defined as −6 dB. The coefficients are defined as a discrete sin c function with a Hamming window of length N+1. The filter magnitude is generally defined as the scaling at the center of the low-pass band after windowing.

High-resolution Interpolating Filter

With these rules in mind, the first filter to design is the high-resolution interpolating filter $F_{I,1}$. Given the desired order N for the low-resolution filter $F_{I,0}$ the rational up-scaling factor n/d and the design rules from the previous paragraph, the only missing parameters are the scaling $\sigma_1$ (in order to cope with the n zeros that have been inserted between known samples), the order for the high-resolution filter $N_1$ and its cut-off normalized frequency $\Omega_1$. These parameters are $\sigma_1=n$, $N_1=N_0 n$ and $\Omega_1=\min(1/n, 1/d)=1/n$. The cut-off frequency obeys to the requirement of eliminating the spectral replicas originated by the insertion of zeros between existing samples.

Low-resolution Equivalent Low-Pass Filter

In this case, no zeros have been introduced between existing samples, so the magnitude of this filter is $\sigma_0=1$. The order of the filter has already been arbitrarily defined and the cut-off frequency is set to $\Omega_0=d/n$. This value compensates for the decimation after the interpolating filter applied to the high-resolution image.

With this filter design, the analyzed low-frequency components of the low-resolution input image match, in terms of normalized bandwidth, the low-frequency component of the desired high-resolution image. Conversely, the analyzed high-frequency component of the low-resolution image can be used for estimating the missing high-frequency band of the high-resolution image.

Figure 7:
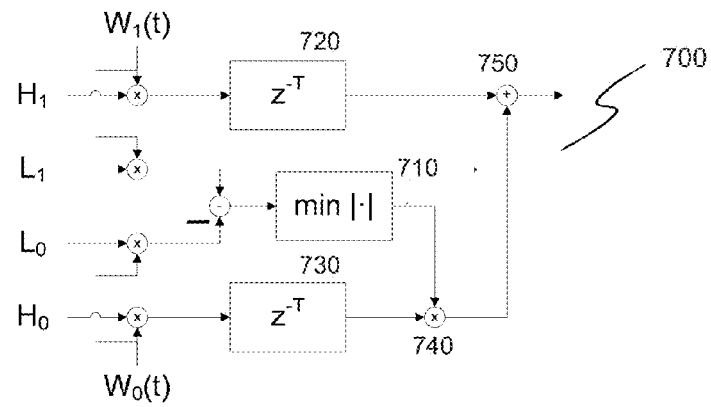
FIG. 7 a conceptual block diagram of the process for synthesizing the high-frequency band $H_1$ of the super-resolved image.

The purpose of the second stage of the invention is to synthesize the high-frequency band of the high-resolution image by exploiting local self-similarity in the input image. This is done is a per-small patch basis; the method will in general benefit from using smaller magnification factors, due to the availability of a wider frequency bandwidth (increased information) for the analyzed low-frequency component of the low-resolution image, which provides a better selectivity for image patches with similar low-frequency contents. This is schematically illustrated in FIG. 7. Further details of the method are discussed in the following FIG. 7 shows exemplarily a conceptual block diagram 700 of the process for synthesizing the high-frequency band of the super-resolved image ($H_1$, initially set to 0), which is done in principle by extrapolating the high-frequency band of the low-resolution image $H_0$. The signals $W_1(t)$ and $W_0(t)$ are spatial windows with positions varying in time accordingly to the current image patches being processed, and symbolize the patch advance and the search window advance, respectively. That is, e.g. the advance and overlap of the small patches (e.g. 5×5 pixels) into which the low-frequency band of the high-resolution image $L_1$ is divided, can be understood as a window $W_1(t)$ that advances at a first speed within the low-frequency high-resolution data structure $L_1$, and at the same within the high-frequency bands of the high-resolution data structure $H_1$. The advance of the search window over the low-frequency band of the low-resolution image $L_0$ is modeled by the time-varying window $W_0(t)$, which is in the same manner applied to the high-frequency band of the low-resolution image $H_0$. A search unit 710 performs an exhaustive search for a best matching block (i.e. the one having minimum SAD) within the search window. Its position is applied to the high-frequency band of the low-resolution image $H_0$, as described above. Since the search usually has a certain duration, this delay is compensated by delay compensation units 720,730. The corresponding patch in the low-resolution high-frequency data structure $H_0$ is extracted in an extraction unit 740 and accumulated to the high-resolution high-frequency data structure $H_1$ in an accumulation unit 750. Similar embodiments can be derived for data structures with different dimensions than 2D, such as 1D or 3D.

The third stage is the formation of the final high-resolution image. The goal of this stage is to properly fuse the low-frequency band of the high-resolution image $L_1$ with the normalized high-frequency band of the high-resolution image $H_1$. The normalized high-frequency high-resolution band $H_1$ can be high-pass filtered prior to the addition with the low-frequency high-resolution band $L_1$. This high-pass filtering is advantageous in order to ensure spectral compatibility, but can be omitted when $L_1$ and $H_1$ have substantially no overlapping frequencies (cf.FIG. 8 b).

Figure 8:
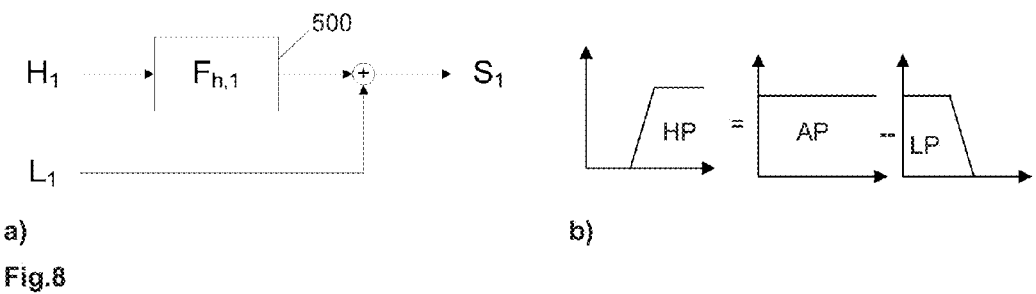
FIG. 8 the fusion of the interpolated low-frequency band $L_1$ and the extrapolated high-frequency band $H_1$ for generating the super-resolved image $S_1$.

FIG. 8 shows exemplarily the fusion of the low-frequency high-resolution band $L_1$ and the normalized high-frequency high-resolution band $H_1$ for generating the super-resolved image $S_1$. The normalized high-frequency band $H_1$ is filtered using a high-pass filter 800 in order to ensure the spectral compatibility with the low-frequency band.

High-resolution High-pass Filter

The filter $F_{h,1}$ is designed in the same fashion as the filters $F_{I,0}$, $F_{I,1}$ in the first stage. In this case, the goal is to obtain a high-pass filter with a cut-off frequency $\Omega_{1,h}=d/\max(n,d)=d/n$. Its order is set to a scaled version of the low-resolution filter order: $N_{1,h}=\mathrm{round}(N_0 n/d)$, and its magnitude $\sigma_{1,h}=1$. The final coefficients of the separable high-pass filter are set to a Kronecker delta aligned with the center of the Hamming window minus the coefficients of the complementary low-pass filter with the same cut-off frequency. That is, the high-pass filter is defined as an all pass-filter (set of coefficients equals a Kronecker delta) minus a low-pass filter with the same cut-off frequency as the desired high-pass filter. This is graphically shown in FIG. 8 *b*), where the left-hand side is the desired frequency response HP of the high-pass filter and the right-hand side is the difference of the responses of an all-pass filter AP and the above described low-pass filter LP.

As has become clear from the above description, the low-frequency band of the high-resolution image $L_1$ is obtained in principle by interpolation, while the high-frequency band of the high-resolution image $H_1$ is obtained in principle by extrapolation.

Figure 9:
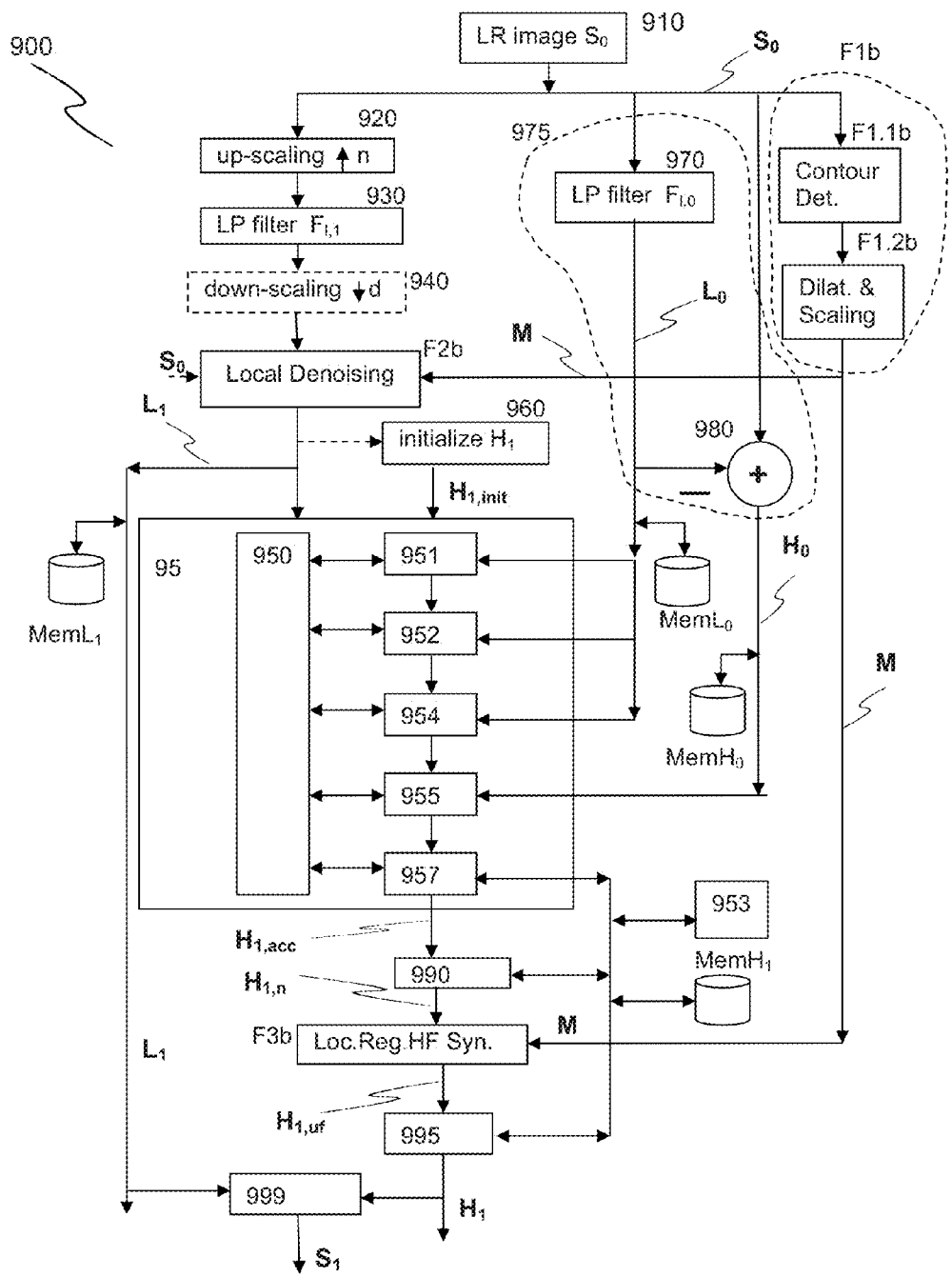
FIG. 9 a block diagram of a device.

FIG. 9 shows an apparatus for performing super-resolution processing of a low resolution input data structure $S_0$ of digital data, comprising a de-noising mask generator F1*b* for generating a de-noising mask M and a splitting module 975 that comprises a first low-pass filter 970 for splitting the input data structure $S_0$ into a low-frequency input data structure $L_0$ and a high-frequency input data structure $H_0$. The apparatus further comprises an upscaler 920 for upscaling the input data structure $S_0$, a second low-pass filter 930 for filtering the upscaled input data structure, a Local De-noiser F2*b* for locally de-noising the filtered upscaled input data structure according to the de-noising mask M, wherein a locally de-noised low-frequency upscaled data structure $L_1$ is obtained, a cross-scale block matching module 95 for generating a normalized high-frequency upscaled data structure $H_{1,n}$ by extrapolating the high-frequency input data structure $H_0$ and normalizing the extrapolated high-frequency upscaled data structure, wherein the extrapolating uses correspondences between the locally de-noised low-frequency upscaled data structure $L_1$ and the low-frequency input data structure $L_0$, and a Local Regularizer F3*b* for locally de-noising the normalized accumulated (i.e. averaged) pixel values within the contour regions, whereby a locally de-noised normalized high-frequency upscaled data structure $H_{1,nf}$ is obtained, a high-pass filter 995 for filtering the locally de-noised normalized high-frequency upscaled data structure $H_{1,nf}$, and a combining unit 999 for combining (e.g. pixel-wise adding) the high-pass filtered locally de-noised normalized high-frequency upscaled data structure $H_1$ to the locally de-noised low-frequency upscaled data structure $L_1$, whereby a de-noised super-resolved data structure $S_1$ is obtained. Various memories $\mathrm{MemL}_0$, $\mathrm{MemL}_1$, $\mathrm{MemH}_0$, $\mathrm{MemH}_1$ with appropriate sizes can be used for intermediate storage, which may however be implemented as one single or more physical memories.

In one embodiment, the splitting module comprises a first low-pass filter 970 for filtering the input data structure $S_0$, wherein a low-frequency input data structure $L_0$ is obtained, and an adder, subtractor or differentiator 980 for calculating a difference between the input data structure $S_0$ and the low-frequency input data structure $L_0$, whereby a high-frequency input data structure $H_0$ is generated.

In one embodiment, the cross-scale block matching module 95 comprises a first determining unit 951 for determining in the locally de-noised low-frequency upscaled data structure $L_1$ a first patch at a first position, a search unit 952 for searching in the low-frequency input data structure $L_0$ a first block that matches the first patch best, and a second determining 954 unit for determining the position of said first block within the low-frequency input data structure $L_0$, a selector unit 955 for selecting a second block in the high-frequency input data structure $H_0$ at the determined position, an accumulator 957 for accumulating pixel data of the selected second block to a second patch, the second patch being a patch in a high-frequency upscaled data structure $H_{1,acc}$ at the first position, a control unit 950 for controlling repetition of the processing for a plurality of patches in the locally de-noised low-frequency upscaled data structure $L_1$, a normalizing unit 990 for normalizing the accumulated pixel values in the HF upscaled data structure $H_{1,acc}$.

The de-noising mask generator F1*b* (which can also be considered as a Region selector block) finds pixels with a high contrast (i.e. contour regions) and selects all pixels in a local neighborhood as part of the contour regions. In one embodiment, it comprises a High-contrast contour detector module F1.1*b* and a Dilation and scaling module F1.2*b*. The High-contrast contour detector module F1.1*b* measures a high contrast by detecting a high first order approximation to the image derivative (e.g. by two Sobel first order derivative estimators) and provides 1-pixel wide contours. The Dilation and scaling module F1.2*b* applies morphologic dilation to the contours, in order to set a predefined width for each contour (e.g. 3 pixels towards both sides of the contour pixels).

Further embodiments, some of which are also shown in FIG. 1 and/or FIG. 9, are described below.

In one embodiment, the method further comprises a step of determining 151,152 a first search window $W_1$ in the low-frequency input data structure $L_0$, wherein the first search window $W_1$ covers an area around a block at a position that corres-ponds to said first position in the high-frequency upscaled data structure $L_1$, and wherein the searching 152, 154 in the low-frequency input data structure $L_0$ is performed only within the first search window $W_1$. The step of determining 151,152 a search window $W_1$ in the low-frequency input data structure $L_0$ is repeated for each new patch in the low-frequency upscaled data structure $L_1$.

In one embodiment, the area that is covered by the search window comprises a plurality of values in each direction of the low-frequency upscaled data structure $L_0$ around the block at the position corresponding to said first position in the high-frequency upscaled data structure $L_1$.

In one embodiment, each new patch $P_{n,L1}$ in the low-frequency upscaled data structure $L_1$ overlaps with at least one previously processed patch.

In one embodiment, the low-frequency upscaled data structure $L_1$ is obtained by upscaling 120 the input data structure $S_0$ by an upscaling factor n, filtering 130 the upscaled input data structure by said second low-pass filter $F_{I,1}$ and downscaling 140 the filtered upscaled input data structure in a downscaling unit 940 by a to downscaling factor d, with n>d. Thus, a final non-integer upscaling factor n/d is obtained.

In one embodiment, the first low-pass filter $F_{I,0}$ and the second low-pass filter $F_{I,1}$ are equivalent filters (i.e., with respect to normalized cut-off frequency).

In one embodiment, the first low-pass filter $F_{I,0}$ has characteristics of an order $N_0$, a magnitude of $\sigma_0=1$ and a normalized cut-off frequency of $\Omega_0=d/n$, and the second low-pass filter $F_{l,1}$ has characteristics of an order $N_1=nN_0$, a magnitude of $\sigma_1=n$ and a normalized cut-off frequency of $\Omega_1=1/n$.

In one embodiment, the method further comprises a step of filtering the high-frequency upscaled data structure $H_{1,acc}$ with a high-pass filter $F_{h,1}$. The high-pass filter $F_{h,1}$ has a normalized cut-off frequency of $\Omega_{1,h}=d/\max\{d,n\}=d/n$, an order of $N_{1,h}=\text{round}(N_0*n/d)$ and a magnitude of $\sigma_{1,h}=1$.

In one embodiment, the method further comprises steps of determining a new patch $P_{n,L1}$ in the low-frequency upscaled data structure $L_1$, searching 152,154 in the low-frequency input data structure $L_0$ a block $B_{n,L0}$ that matches the selected patch $P_{n,L1}$ best, selecting 155 a corresponding block $B_{n,H0}$ in the high-frequency input data structure $H_0$ and accumulating 157 pixel data of the selected corresponding block $B_{n,H0}$ to a patch $P_{n,H1}$ in the high-frequency upscaled data structure $H_{1,acc}$ at the position of said new patch $P_{n,L1}$ are repeated for all patches until the complete low-frequency upscaled data structure $L_1$ is covered.

In one embodiment, the method further comprises a step of counting the number of contributions per pixel in the high-frequency upscaled data structure $H_{1,acc}$, i.e. the number of blocks from the high-frequency input data structure $H_0$ that contributed to a pixel of the high-frequency upscaled data structure $H_{1,acc}$. The step of normalizing 190 comprises then dividing the accumulated value per pixel in $H_{1,acc}$ by the number of contributions.

In one embodiment, the input data structure is a 2D digital image. In another embodiment, the input data structure is a 3D digital image. A digital image may generally be part of a digital video sequence.

In one embodiment, the input data structure comprises digital 2D data, and each block and each patch comprise at least 5×5 values, the search window covers at least 9×9 values and each patch overlaps at least one earlier processed patch by at least 2 values.

In one embodiment, the apparatus further comprises at least one memory $MemL_0$, $MemL_1$, $MemH_0$, $MemH_1$ for intermediate storage of at least one of the LF input data structure $L_0$, the LF upscaled data structure $L_1$, the HF input data structure $H_0$ and the HF upscaled data structure $H_1$.

In one embodiment, the apparatus further comprises within the search unit 952 a search window determining unit for determining a search window $W_1$ in the low-frequency input data structure $L_0$, wherein the search window $W_1$ covers an area around a block at a position that corresponds to said first position in the high-frequency upscaled data structure $L_1$, and wherein the search unit 952 searches in the low-frequency input data structure $L_0$ only within the first search window $W_1$.

In one embodiment, the apparatus further comprises a counter 953 for counting the number of contributions per pixel in the high-frequency upscaled data structure $H_{1,acc}$. The normalizing unit 990 performs an operation of dividing the accumulated value per pixel by the number of contributions.

Figure 10:
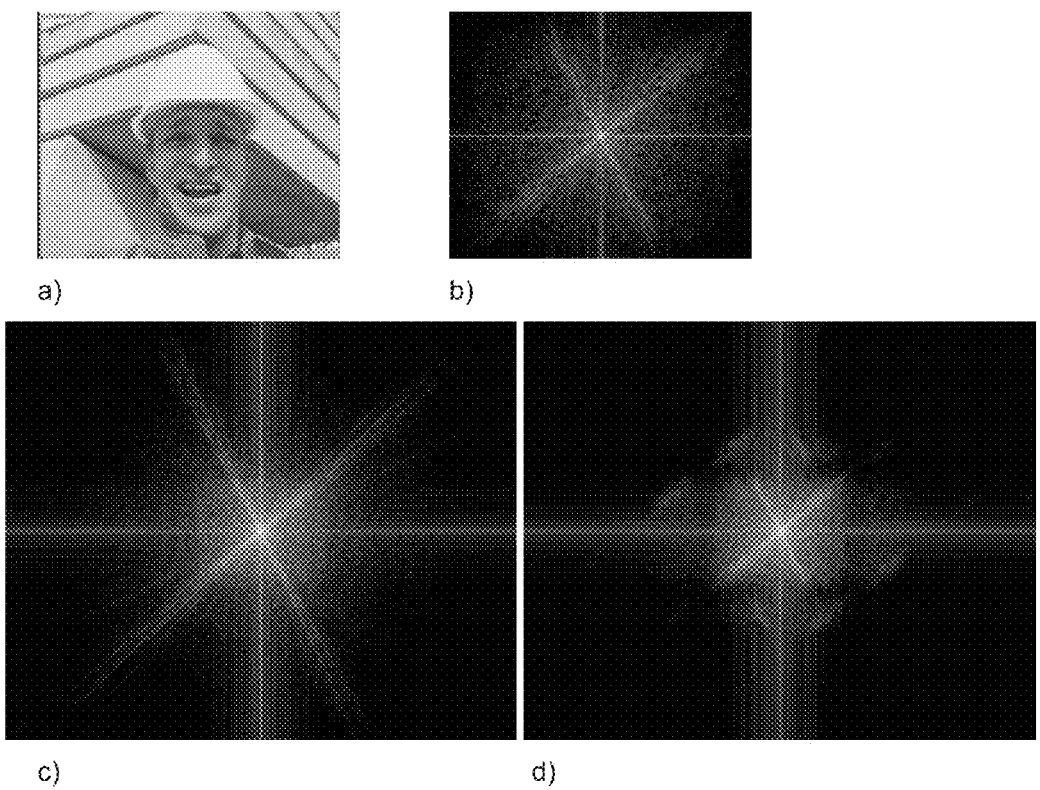
FIG. 10 a spectrum of an image upscaled according to the invention, compared with a spectrum of a conventionally upscaled image.

FIG. 10 shows, in a) and b), an image and its original spectrum. Further, FIG. 10 c) shows the spectrum of the image after it was upscaled according to the invention, and FIG. 10 d) the spectrum of the image after it was conventionally upscaled using the known bi-cubic interpolation. As can be recognized, the clipped spectrum of the conventionally upscaled image is improved, which is in this example visible in additional values along the diagonals. In other words, it is an advantage of the present invention that the spectrum of a data structure that was upscaled according to the invention comes closer to the original spectrum, than the spectrum of a data structure that was upscaled using a conventional method.

The frequency spectrum shows clearly how the disclosed method is able to plausibly extrapolate the missing high frequencies of the up-scaled image (they can be observed in sharper contours in the up-scaled images, which result in more visually appealing images), whereas bi-cubic interpolation introduces a large amount of aliasing artifacts The disclosed method has been implemented and tested on a number of publicly available low-resolution input images for which higher resolution versions are to be estimated. In one embodiment, it is generally applied only to the luminance channel of the input images, leaving the color up-scaling to faster algorithms like bi-cubic interpolation. In the example of FIG. 10, a super-resolved image has been obtained by iteratively applying small up-scaling factors of 1.5×(n=3, d=2) three times to the input image.

Figure 11:
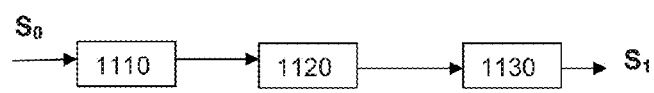
FIG. 11 three principle stages of the invention.

FIG. 11 shows the three principle stages comprised in one embodiment of the disclosed method for improving robustness in super-resolving a single image. In a first stage 1110, an interpolation-based up-scaling of the input image is performed, followed by an equivalent low-pass filtering operation on the low-resolution image and a first de-noising operation on the low-resolution image. The second stage 1120 comprises a search for low-frequency matches between an inspected patch in the high-resolution image and patches in a local neighborhood in the low-resolution low-frequency image, including partly overlapping patches, and accumulating the high-frequency contribution obtained from the low-resolution image. The third stage 1130 comprises normalizing and high-pass filtering, performing a second de-noising operation and adding the contributions of the low-frequency band of the high-resolution image and the extrapolated, high-pass filtered, normalized high-frequency band.

Figure 13:
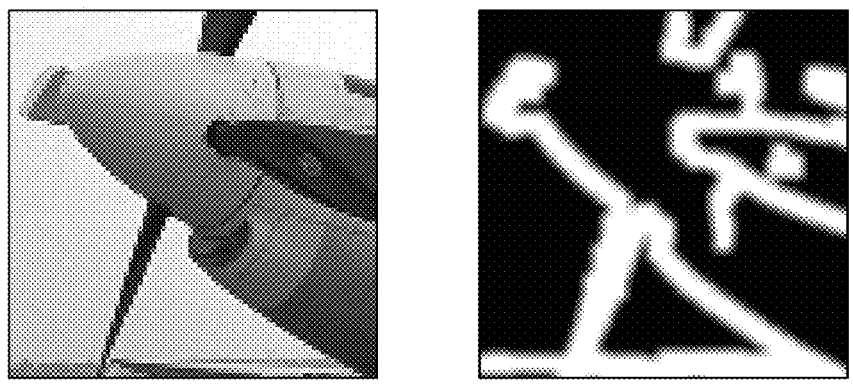
FIG. 13 an aliased input image and its corresponding de-noising mask.

FIG. 13 shows exemplarily an aliased input image (left-hand side) and its corresponding de-noising mask (right-hand side). Apparently the noisy regions were determined mainly near edges or contours in the image.

Figure 12:
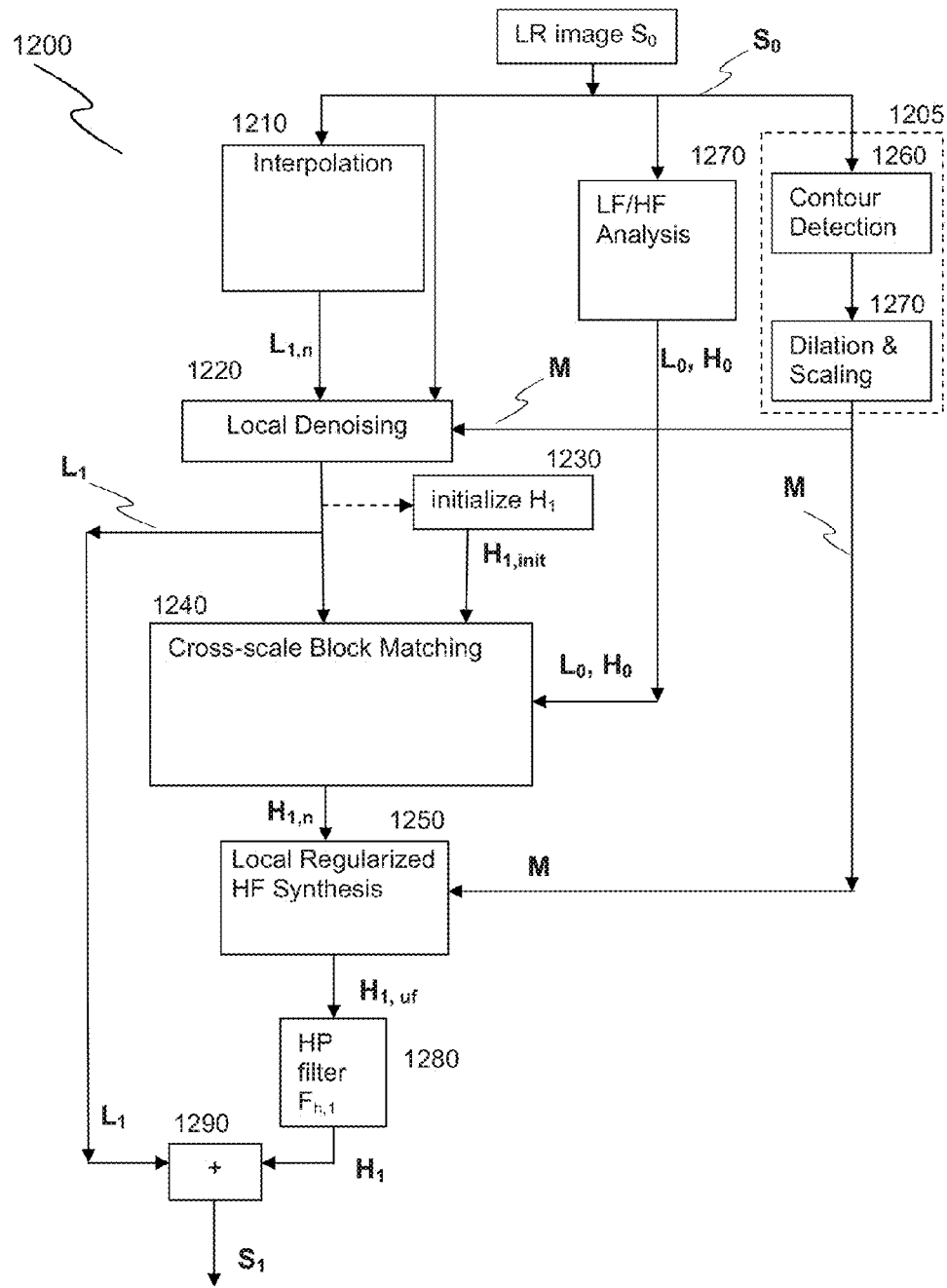
FIG. 12 a flow-chart of a method for improving robustness against aliasing in a method for performing super-resolution processing.

FIG. 12 shows, in an embodiment of the present invention, a flow-chart of a method for improving robustness against aliasing in a method for performing super-resolution processing of a low resolution input data structure $S_0$ of digital 1D, 2D or 3D data. In this embodiment, the method 1200 comprises steps of generating 1205 in a Region selector a de-noising mask M, comprising a contour detection step 1260 and a dilation and scaling step 1270, splitting or separating 1270 the input data structure $S_0$ into a low-frequency input data structure $L_0$ and a high-frequency input data structure $H_0$ complementary to the low-frequency input data structure $L_0$, interpolating 1210 from the input data structure $S_0$ a noisy low-frequency upscaled data structure $L_{1,n}$, locally de-noising 1220 the noisy low-frequency upscaled data structure $L_{1,n}$ in regions indicated as contour regions by the de-noising mask M, whereby a locally de-noised low-frequency upscaled data structure $L_1$ is obtained, performing cross-scale block matching 1240 on the locally de-noised LF upscaled data structure $L_1$, including normalization, as described above, whereby a normalized high-frequency upscaled data structure $H_{1,n}$ is obtained, locally de-noising the normalized high-frequency upscaled data structure $H_{1,n}$ in a locally regularized HF synthesis step 1250, whereby the local de-noising is performed in regions indicated as contour regions by the de-noising mask M (i.e. the same regions as used for locally de-noising the noisy low-frequency upscaled data structure $L_{1,n}$) and whereby a locally de-noised normalized high-frequency upscaled data structure $H_{1,uf}$ is obtained, filtering 1280 the locally de-noised normalized high-frequency upscaled data structure $H_{1,uf}$ in a high-pass filter $F_{h,1}$ (as described above), whereby a high-pass filtered locally de-noised normalized high-frequency upscaled data structure $H_1$ is obtained, and adding 1290 the locally de-noised normalized high-frequency upscaled data structure $H_1$ to the locally de-noised low-frequency upscaled data structure $L_1$, whereby a super-resolved data structure $S_1$ is obtained.

In various embodiments, some or all of the steps or elements of the method are as described above with respect to FIG. 1-11.

In a similar embodiment of the present invention, an apparatus for improving robustness against aliasing in an application for performing super-resolution processing of a low resolution input data structure $S_0$ of digital 1D, 2D or 3D data comprises a generating unit for a de-noising mask, comprising a contour detection unit and a dilation and scaling unit, a splitting or separating unit for splitting or separating the input data structure $S_0$ into a LF input data structure $L_0$ and a HF input data structure $H_0$ complementary to the LF input data structure $L_0$, an interpolation unit for interpolating from the input data structure $S_0$ a (potentially noisy) low-frequency upscaled data structure $L_{1,n}$, a local de-noising unit for locally de-noising the noisy low-frequency upscaled data structure $L_{1,n}$ in regions indicated as contour regions by the de-noising mask, whereby a locally de-noised LF upscaled data structure $L_1$ is obtained, a cross-scale block matching unit for performing cross-scale block matching on the locally de-noised LF upscaled data structure $L_1$, including a normalize for normalization as described above, whereby a normalized HF upscaled data structure $H_{1,n}$ is obtained, a Local Regularized HF Synthesis unit for locally de-noising the normalized high-frequency upscaled data structure in a locally regularized HF synthesis, whereby the local de-noising is performed in regions indicated as contour regions by the de-noising mask and whereby a locally de-noised normalized HF upscaled data structure $H_{1,uf}$ is obtained, a high-pass filter $F_{h,1}$ (as described above) for filtering the locally de-noised normalized HF upscaled data structure $H_{1,uf}$, whereby a high-pass filtered locally de-noised normalized HF upscaled data structure $H_1$ is obtained, and an adder unit for (1D, 2D or 3D) adding the locally de-noised normalized HF upscaled data structure $H_1$ to the locally de-noised LF upscaled data structure $L_1$, whereby a super-resolved data structure $S_1$ is obtained. In various embodiments, some or all of the steps or elements of the method are as described above.

As shown in FIG. 12, the concatenation of the High-contrast contour detection block 1260 and Dilation and scaling block 1270 make a Region selector block 1205, and the Local De-noising block 1220 and Local regularized HF synthesis block 1250 prevent the propagation of aliasing that is potentially present in the input low-resolution image. In one embodiment, the Local De-noising block 1220 executes a regularized mechanism for removing undesired high-frequency texture (i.e. noise) in the regions selected by the Region selector block 1205. Finally, the Local regularized HF synthesis block 1250 generates a High-Resolution HF band that is free from artifacts, at least for artifacts resulting from the presence of aliasing in the LR input image.

In the following, embodiments of the Region selector 1205 with the High-contrast contour detection block 1260 and the Dilation and scaling block 1270, the Local De-noising block 1220 and Local regularized HF synthesis block 1250 are described in more detail.

Region Selector

The goal of this stage is to find pixels with a high contrast and to pick all pixels in a local neighborhood as part of the contour region. In one embodiment, the high contrast is measured as a first order approximation to the image derivative. The Region selector block 1205 provides a de-noising mask M to subsequent stages.

High-contrast Contour Detection Block

In this stage, two Sobel first order derivative estimators are used to obtain the vertical and horizontal image derivatives. Then, all pixels with a horizontal or vertical derivative above a certain threshold (e.g. 0.1) are selected as contour pixels, and a posterior thinning stage provides 1-pixel wide contours. This technique is standard in image processing. In other embodiments, this stage is implemented as a dedicated aliasing detector, or a combination of both methods.

In all cases, the goal is to select regions in the image prone to be affected by aliasing artifacts.

Dilation and Scaling Block 1270

As another standard technique, morphologic dilation is applied in order to set a predefined width for the contour (e.g. 3 pixels towards both sides of the contour pixels). This defines a region with potential artifacts, especially aliasing-derived artifacts, which is to be processed in subsequent stages.

Since the remaining computations are to be made in images (or sub-images) with a scale corresponding to the final super-resolved image, the dilated contour is up-scaled to match the resolution of the super-resolved image.

Local De-noising Block 1220

For the following calculations, let $X_1$ be the interpolated LF band of the super-resolved image obtained by up-scaling the input low-resolution image $I_0$ (that is, $X_1$ corresponds to $L_{1,n}$ in FIG. 12, and $I_0$ to $S_0$). Then, we want to obtain an aliasing-free estimate of the LF band of the SR image. Knowing the structure of aliasing artifacts, namely small scale high-frequency variations, we convert the problem of aliasing removal into a de-noising problem within the region of interest selected in the Region selector 1205. The model is defined as $$M(L_1) := \min_{L_1} \lceil \|M(L_1 - X_1)\|_2^2 + \lambda M(\|\nabla L_1\|_1) \rceil \quad (1)$$

In other words, a Total Variation (TV) regularizer is imposed on the region of interest defined by the binary mask (or signaling function) M. The value of the regularization factor λ must be set such that it removes undesired artifacts while keeping details. This can be solved by normalized-cross correlation approaches. Values around 0.05 (e.g. 0.03 . . . 0.07) perform well in practice. The purpose of this type of regularizer is to remove undesired HF structures in regions with a potential risk of containing aliasing. The remaining pixels of $L_1$ (those for which the mask M indicates that it is not a contour region) are set to the values contained in $X_1$.

In order to find the minimum of the functional described above, an iterative gradient method is applied, which requires a sufficient number of iterations (e.g. 100) in order to converge to the optimal value. The iterative solution, where the super-indices t and t+1 refer to the iteration, is found as $$M(L_1)^{t+1} := M(L_1)^t - \mu^t \nabla \{\|M(L_1^t - X_1)\|_2^2 + \lambda M(\|\nabla L_1^t\|_1)\} \quad (2)$$

The step $\mu^t$ is initialized to a relatively high value, e.g. 0.1 (±10%), allowing large variations during the first iterations, when the problem is far from convergence. A realistic example for the selection of $\mu$ is: $\mu^{ini}=0.1$, $\mu^{end}=0.01$ and $$\mu^t := \mu^{t-1} \times (\mu^{end}/\mu^{ini})^{(1/(nmax-1))} \qquad (2a)$$

with nmax being a maximum number of iterations. Then $\mu$ is exponentially decreased in each iteration, so that in the last iterations, when the problem is close to convergence, only small changes in the close-to-optimal solution are allowed. The method terminates whenever the magnitude of the gradient $\nabla\{\|M(L_1^2-X_1)\|_2^2+\lambda M(\|\nabla L_1^2\|_1)\}$ falls below a certain given threshold or a maximal number of iterations is reached.

At the output of the Local De-noising block 1220, a new version of the LF band of the super-resolved image is obtained, which has greatly reduced the presence of at least those artifacts that result from spatial aliasing in the input image in the regions detected in the Region selector 1205.

Local Regularized HF Synthesis Block 1250

Similarly to the Local De-noising block 1220, the aliasing is modeled as the presence of HF information in regions with a high contrast around contours. Whereas in non-contour regions the value of each pixel in the high-frequency band is generated as the average of the contributions from $N_c$ overlapping patches, as described above, this contribution is regularized in selected regions (namely contour regions) in order to neutralize, or at least reduce, the propagation of aliasing in the super-resolved image.

In order to simplify the notation in the following, we will assume that the same amount of overlapping contributions are obtained for each pixel (although this may not hold for pixels e.g. close to the contour), and that the contributions for each pixel coming from an image block at a fixed distance are combined in a complete noisy high-frequency band $X_i$ for $i=\{1, \ldots, N_c\}$.

Let $H_1$ be the desired HF band of the SR image (before high-pass filtering) to be synthesized by exploiting cross-scale self-similarity. Then, the HF band of the region of interest, as signaled by the indicator function (i.e. the de-noising mask) M used also in the Local De-noising block 1220, is formulated as $$M(H_1)i = \min_{H_c}\{\|\Sigma_{i=1}^{N_c} M(H_1-X_i)\|_2^2+\lambda M(\|\nabla H_1\|_1)\} \qquad (3)$$

The same gradient descent approach is employed to minimize this functional and define the contents of the high-frequency band in the region signaled by the mask of potential aliasing-affected pixels (i.e. the de-noising mask) M. The remaining pixels are set to the average of the contributions, as described above. If we define N as a mask that is complementary to M, such that M+N=1 everywhere in the image, the complete synthesized high-frequency band is composed as $$H_1 = M(H_1) + N\left(\frac{1}{N_o}\sum_{i=1}^{N_c} X_i\right) \qquad (4)$$

An advantage of the improved robustness is that super-resolved image obtained thereof are free from artifacts in zones with high-contrast contours, which are the ones where aliasing is more likely to occur. Therefore, in images where normal super-resolution processing leads to undesired fluctuations across aliased high-contrast contours in the input image, perceptually more realistic and sharp super-resolution are obtained due to the improved robustness. Further, the method can be efficiently implemented on a GPU or other parallel processor. It can be used in imaging systems for super-resolution algorithms including multi-core processors that correctly super-resolve aliased input data when only one image is available.

As another advantage, the disclosed method is comparatively computationally efficient (it requires only a single-image, and the main processing step is a small-scale local search), flexible in the definition of the up-scaling factor (it enables rational up-scaling factors and straightforward FIR filter design) and can also be generalized for processing signals of different nature (no prior assumptions on the signal model, beyond local self-similarity, are required).

A further advantage of the invention is that only a single upscaling procedure of the input data structure is employed, and the extrapolation is made from the input data structure at its original resolution. Thus, the amount of artifacts introduced by upscaling is minimized, which is particularly advantageous for rational upscaling factors, and a broad high-frequency band is available for augmenting the information in the high-frequency high-resolution data structure.

A further advantage of the invention is that explicit, simple rules for designing the filters are provided, and that the filters need to be designed only once, since they are space-invariant.

A further advantage of the invention is that, due to the spatial averaging, the high-frequency high-resolution data structure $H_1$ is more robust to noise and other artifacts than others that are obtained with conventional methods.

A further advantage of the invention is that the procedure for fusing the interpolated low-frequency high-resolution band $L_1$ and the extrapolated high-frequency high-resolution band $H_1$ takes the spectral coherence between them into consideration. This is achieved by appropriate design of the high-pass filter for the high-frequency high-resolution data structure.

In the above, the sub-index 0 is used to refer to the low-resolution image and the sub-index 1 to refer to the super-resolved image. The capital letters L and H correspond to the low-frequency and high-frequency bands, respectively. Indices acc, n and of stand for "accumulated", "normalized/noisy" and "un-filtered".

It should be noted that although shown simply as a digital image, other types of digital data structures may be constructed other than digital images, as would be apparent to those of ordinary skill in the art, all of which are contemplated within the present invention. Similar principles can be applied to other image processing tasks, like image denoising or other restoration procedures, and also for obtaining super-resolved signals of different nature and dimensionality, e.g. audio signals. Further, although in the embodiments described herein the local de-noising is applied separately to pixels of both the HF band of the HR image and the LF band of the HR image, in regions as defined by the de-noising mask, an advantageous effect is also achieved when the local de-noising is applied to at least one of the HF band and the LF band of the HR image.

The disclosed method and apparatus work with a single-image, but advantageously without requiring a data-base for retrieving adequate examples containing high-frequency portions (i.e. details).

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Exemplarily, although the present invention has been disclosed with regard to square blocks and patches, one skilled in the art would recognize that the method and devices described herein may be applied to blocks and patches of other shapes and/or sizes, e.g. rectangle shapes or free-form shapes, 4×4, . . . , 16×16 squares etc. Further, although the present invention has been disclosed with regard to spatial resolution, one skilled in the art would recognize that the method and devices described herein may, mutatis mutandis, also be applied to temporal resolution. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two, e.g. on graphics hardware (GPU). Reference numerals appearing in the claims are by way of illustration only and shall have no limiting to effect on the scope of the claims.

Cited References

"*Super Resolution from Image Sequences*", M. Irani and S. Peleg (Int. Conf. on Pattern Recognition, 1990)

*Fundamental Limits of Reconstruction-Based Superresolution Algorithms under Local Translation*", Z. Lin and H.-Y. Shum (IEEE Trans. On Pattern Analysis and Machine Intelligence, 2004)

"*Example-based super-resolution*", W. T. Freeman, T. R. Jones and E. C. Pasztor (IEEE Computer Graphics and Applications, 2002)

"*Super-Resolution from a Single Image*", D. Glasner, S. Bagon and M. Irani (IEEE Int. Conf. on Computer Vision, 2009)

"*Space-Time Super-Resolution from a Single Video*", O. Shahar, A. Faktor and M. Irani (IEEE Conf. on Computer Vision and Pattern Recognition, 2011)

"*Image and Video Upscaling from Local Self-Examples*", G. Freedman and R. Fattal (ACM Trans. On Graphics, 2010)

The invention claimed is:

1. A method for performing super-resolution processing of a low resolution input data structure of digital 1D, 2D or 3D data, comprising steps of detecting one or more regions in the low resolution input data structure where aliasing is likely to occur, and generating a de-noising mask that indicates the detected one or more regions in the low resolution input data structure;

splitting the input data structure into a low-frequency input data structure and a high-frequency input data structure complementary to the low-frequency input data structure, wherein a first low-pass filter is used;

upscaling the input data structure and filtering the upscaled input data structure by a second low-pass filter, wherein a low-frequency upscaled data structure is obtained;

locally de-noising one or more regions in the low-frequency upscaled data structure according to the de-noising mask, wherein a locally de-noised low-frequency upscaled data structure is obtained;

generating a normalized high-frequency upscaled data Structure by extrapolating the high-frequency input data structure, wherein correspondences between the locally de-noised low-frequency upscaled data structure and the low-frequency input data structure are used, and wherein cross-scale block matching and normalization are performed;

locally de-noising the normalized high-frequency upscaled data structure in a local regularization step, whereby the local de-noising is performed in said one or more regions according to the de-noising mask, and whereby a locally de-noised normalized high-frequency upscaled data structure is obtained;

high-pass filtering the normalized high-frequency upscaled data structure, whereby a high-pass filtered normalized high-frequency upscaled data structure is obtained; and adding the high-pass filtered normalized high-frequency upscaled data structure to the low-frequency upscaled data structure, whereby a super-resolved data structure is obtained.

2. The method according to claim 1, wherein the step of generating a normalized high-frequency upscaled data structure comprises:

determining in the locally de-noised low-frequency upscaled data structure a first patch at a first position;

searching in the low-frequency input data structure a first block that matches the first patch best, and determining the position of said first block within the low-frequency input data structure;

selecting a second block in the high-frequency input data structure at the determined position;

accumulating pixel data of the selected second block to a second patch, the second patch being a patch in a high-frequency upscaled data structure at the first position;

repeating the steps of determining a new patch in the locally de-noised low-frequency upscaled data structure, searching in the low-frequency input data structure a block that matches the selected patch best, selecting a corresponding block in the high-frequency input data structure and accumulating pixel data of the selected corresponding block to a patch in the high-frequency upscaled data structure at the position of said new patch; and normalizing the accumulated pixel values in the high-frequency upscaled data structure, whereby a normalized high-frequency upscaled data structure is obtained.

3. The method according to claim 2, wherein each new patch in the locally de-noised low-frequency upscaled data structure overlaps with at least one previously processed patch.

4. The method according to claim 2, further comprising determining a first search window in the low-frequency input data structure, wherein the first search window covers an area around a block at a position that corresponds to said first position in the high-frequency upscaled data structure, wherein the searching in the low-frequency input data structure is performed only within the first search window, and wherein the a search window in the low-frequency input data structure is repeated for each new patch in the locally de-noised low-frequency upscaled data structure.

5. The method according to claim 2, further comprising a step of counting the number of contributions per pixel in the high-frequency upscaled data structure, wherein the normalizing comprises dividing the accumulated value per pixel by the number of contributions.

6. The method according to claim 1, wherein the detecting one or more regions in the low resolution input data structure where aliasing is likely to occur comprises contour detection.

7. The method according to claim 6, wherein the detecting one or more regions in the low resolution input data structure further comprises dilation and scaling, wherein at least one contour detected in the contour detection is broadened and wherein the broadened contour is scaled to the scale of the super-resolved data structure.

8. The method according to claim 1, wherein the locally de-noising the one or more regions in the low-frequency upscaled data structure comprises applying a Total Variation regularization onto the one or more contour regions that are indicated by the de-noising mask as regions where aliasing is likely to occur.

9. The method according to claim 1, wherein at least one of the locally de-noising the one or more regions in the low-frequency upscaled data structure and locally de-noising the normalized high-frequency upscaled data structure comprises applying a Total Variation regularization onto the one or more contour regions that are indicated by the de-noising mask as regions where aliasing is likely to occur.

10. The method according to claim 1, wherein the locally de-noising the one or more regions in the low-frequency upscaled data structure comprises applying a Total Variation regularization synthesizes pixels of the locally de-noised normalized high-frequency upscaled data structure from pixels of the input low resolution input data structure.

11. The method according to claim 1, wherein the low-frequency upscaled data structure is obtained by upscaling the input data structure by an upscaling factor n, filtering the upscaled input data structure by said second low-pass filter and downscaling the filtered upscaled input data structure by a downscaling factor d, with n>d, wherein a final non-integer upscaling factor n/d is obtained.

12. The method according to claim 1, wherein the filtering the normalized high-frequency upscaled data structure is performed by a high-pass filter having a normalized cut-off frequency of $\Omega_{1,h}=d/n$, an order of $N_{1,h}=\text{round}(N_0*n/d)$ and a magnitude of $\sigma_{1,h}=1$.

13. The method according to claim 1, wherein the input data structure comprises digital 2D data, and wherein each block and each patch comprise at least 5×5 values, the search window covers at least 9×9 values and each patch overlaps at least one earlier processed patch by at least 2 values.

14. An apparatus for performing super-resolution processing of a low resolution input data structure of digital data, comprising
a de-noising mask generator configured to generate a de-noising mask indicating one or more regions in the low resolution input data structure where aliasing is likely to occur;
a splitting module configured to split the input data structure into a low-frequency input data structure and a high-frequency input data structure complementary to the low-frequency input data structure, wherein a first low-pass filter is used;
an upscaler configured to upscale the input data structure;
a second low-pass filter configured to filter the upscaled input data structure to obtain a low-frequency upscaled data structure;
a Local De-noiser configured to locally de-noise said one or more regions indicated by the de-noising mask from the low-frequency upscaled input data structure to obtain a locally de-noised low-frequency upscaled data structure;
a cross-scale block matching module configured to generate a normalized high-frequency upscaled data structure by extrapolating the high-frequency input data structure and normalizing the extrapolated high-frequency upscaled data structure, wherein the extrapolating uses correspondences between the locally de-noised low-frequency upscaled data structure and the low-frequency input data structure;
a Local Regularizer for locally de-noising, said one or more regions indicated by the de-noising mask from the normalized high-frequency upscaled data structure to obtain a locally de-noised normalized high-frequency upscaled data structure;
a high-pass filter configured to filter the locally de-noised normalized high-frequency upscaled data structure to obtain a high-pass filtered normalized high-frequency upscaled data structure; and
a combining unit configured to combine the high-pass filtered locally de-noised normalized high-frequency upscaled data structure and the locally de-noised low-frequency upscaled data structure to obtain a super-resolved data structure.

15. The apparatus of claim 14, wherein the cross-scale block matching module comprises
a first determining unit configured to determine, in the low-frequency upscaled data structure a first patch at a first position;
a search unit configured to search in the low-frequency input data structure a first block that matches the first patch best;
a second determining unit configured to determine the position of said first block within the low-frequency input data structure;
a selector unit configured to select a second block in the high-frequency input data structure at the determined position;
an accumulator configured to accumulate pixel data of the selected second block to a second patch, the second patch being a patch in a high-frequency upscaled data structure at the first position;
a control unit configured to control repetition of the processing for a plurality of patches in the low-frequency upscaled data structure; and
a normalizing unit configured to normalize the accumulated pixel values in the high-frequency upscaled data structure, whereby a normalized high-frequency upscaled data structure is obtained, and wherein the de-noising mask generator comprises
a high-contrast contour detector module; and
a dilation and scaling module.

* * * * *